(12) United States Patent
Kim (10) Patent No.: US 8,054,803 B2
(45) Date of Patent: *Nov. 8, 2011

(54) METHOD AND APPARATUS FOR OPTIMIZING NEIGHBOR LIST AUTOMATICALLY IN SYNCHRONOUS CDMA NETWORK

(75) Inventor: Shin-Jae Kim, Gyeonggi-do (KR)

(73) Assignee: KTFreetel Co., Ltd., Seoul (KR)

( * ) Notice: Subject to any disclaimer, the term of this patent is extended or adjusted under 35 U.S.C. 154(b) by 923 days.

This patent is subject to a terminal disclaimer.

(21) Appl. No.: 12/065,316

(22) PCT Filed: Aug. 28, 2006

(86) PCT No.: PCT/KR2006/003388
§ 371 (c)(1),
(2), (4) Date: Feb. 29, 2008

(87) PCT Pub. No.: WO2007/027033
PCT Pub. Date: Mar. 8, 2007

(65) Prior Publication Data
US 2008/0225797 A1 Sep. 18, 2008

(30) Foreign Application Priority Data

Aug. 29, 2005 (KR) .................. 10-2005-0079540
Dec. 14, 2005 (KR) .................. 10-2005-0123414

(51) Int. Cl.
*H04Q 7/00* (2006.01)
(52) U.S. Cl. ......... 370/331; 455/343; 455/25; 455/63.4; 455/436; 455/442; 370/328; 370/329
(58) Field of Classification Search ............ 370/328, 370/331, 332, 334; 455/25, 63.4, 562.1, 455/436, 440, 443, 444
See application file for complete search history.

(56) References Cited

U.S. PATENT DOCUMENTS

| | | | |
|---|---|---|---|
| 5,640,676 A * | 6/1997 | Garncarz et al. | 455/436 |
| 5,854,981 A * | 12/1998 | Wallstedt et al. | 455/439 |
| 5,920,549 A | 7/1999 | Bruckert et al. | |
| 6,119,005 A | 9/2000 | Smolik | |
| 6,360,098 B1 * | 3/2002 | Ganesh et al. | 455/436 |
| 7,065,361 B1 * | 6/2006 | Fortuna | 455/438 |
| 7,110,766 B1 * | 9/2006 | Tayloe et al. | 370/331 |
| 2003/0039228 A1 * | 2/2003 | Shiu et al. | 370/331 |
| 2003/0176189 A1 * | 9/2003 | Merson et al. | 455/436 |
| 2003/0190916 A1 * | 10/2003 | Celedon et al. | 455/437 |
| 2004/0121773 A1 * | 6/2004 | O'Brien | 455/438 |
| 2004/0166858 A1 * | 8/2004 | Masuda et al. | 455/436 |
| 2004/0235478 A1 * | 11/2004 | Lindquist et al. | 455/440 |
| 2005/0048974 A1 * | 3/2005 | Kim et al. | 455/436 |
| 2005/0148368 A1 * | 7/2005 | Scheinert et al. | 455/561 |

FOREIGN PATENT DOCUMENTS

| | | |
|---|---|---|
| KR | 10-20040048038 | 6/2004 |
| KR | 10-20050024643 | 3/2005 |

* cited by examiner

*Primary Examiner* — Ian N Moore
*Assistant Examiner* — Tam Phan
(74) *Attorney, Agent, or Firm* — Jones Day

(57) ABSTRACT

A method for automatically optimizing a neighbor list for processing handover in a synchronous CDMA (Code Division Multiple Access) network includes the steps of: collecting neighbor list data, call fault data, handover statistical data, base station location data and PN information data of each base station sector in a nationwide network; extracting all target sectors available for handover by analyzing the collected data; endowing a weighting factor to the extracted target sectors according to importance and then sorting the target sectors according to calculated results so as to determine priorities; and subsequently inputting the target sector information to the neighbor list according to the priorities.

13 Claims, 4 Drawing Sheets

| Bts_name | sid | nid | bsc | bts | sector | Index | nsid | npn | nnid | nbsc | nbts | nsector | nbts_name |
|---|---|---|---|---|---|---|---|---|---|---|---|---|---|
| LS0092X | 2189 | 12 | 0 | 0 | 0 | 0 | 2189 | 312 | 12 | 0 | 0 | 1 | SL0092X |
| LS0092X | 2189 | 12 | 0 | 0 | 0 | 1 | 2189 | 278 | 12 | 0 | 1 | 1 | SL0582X |
| LS0092X | 2189 | 12 | 0 | 0 | 0 | 2 | 2189 | 218 | 12 | 0 | 3 | 1 | SL0566X |
| LS0092X | 2189 | 12 | 0 | 0 | 0 | 3 | 2189 | 26 | 12 | 1 | 8 | 0 | SL0615X |
| LS0092X | 2189 | 12 | 0 | 0 | 0 | 4 | 2189 | 446 | 12 | 0 | 1 | 2 | SL0582X |
| LS0092X | 2189 | 12 | 0 | 0 | 0 | 5 | 2189 | 64 | 12 | 0 | 7 | 0 | SL0328X |
| LS0092X | 2189 | 12 | 0 | 0 | 0 | 6 | 2189 | 232 | 12 | 0 | 7 | 1 | SL0328X |
| LS0092X | 2189 | 12 | 0 | 0 | 0 | 7 | 2189 | 84 | 12 | 0 | 6 | 0 | SL0616X |
| LS0092X | 2189 | 12 | 0 | 0 | 0 | 8 | 2189 | 38 | 12 | 1 | 2 | 0 | SL0531X |
| LS0092X | 2189 | 12 | 0 | 0 | 0 | 9 | 2189 | 108 | 12 | 1 | 11 | 0 | SL1204X |
| LS0092X | 2189 | 12 | 0 | 0 | 0 | 10 | 2189 | 236 | 12 | 0 | 2 | 1 | SL0004X |
| LS0092X | 2189 | 12 | 0 | 0 | 0 | 11 | 2189 | 172 | 12 | 2 | 3 | 1 | SL0088X |
| LS0092X | 2189 | 12 | 0 | 0 | 0 | 12 | 2189 | 268 | 12 | 2 | 5 | 1 | SL0090X |
| LS0092X | 2189 | 12 | 0 | 0 | 0 | 13 | 2189 | 40 | 78 | 2 | 0 | 0 | OtherNid_BTS |
| LS0092X | 2189 | 12 | 0 | 0 | 0 | 14 | 2189 | 354 | 12 | 1 | 5 | 2 | SL0367X |
| LS0092X | 2189 | 12 | 0 | 0 | 0 | 15 | 2189 | 100 | 12 | 2 | 5 | 0 | SL0090X |
| LS0092X | 2189 | 12 | 0 | 0 | 0 | 16 | 2189 | 194 | 12 | 1 | 8 | 1 | SL0615X |
| LS0092X | 2189 | 12 | 0 | 0 | 0 | 17 | 2189 | 46 | 12 | 1 | 3 | 0 | SL0096X |

[Fig. 6]

| EQUIPNAME | LATITUDE | LONGITUDE | SID | NID | BTS | TYPE | SECTORCNT | PNA | PNB | PNG |
|---|---|---|---|---|---|---|---|---|---|---|
| SL0092X | 37-33-27.966 | 126-58-32.610 | 2189 | 12 | 0 | SECTOR | 2 | 144 | 312 | - |
| SL0582X | 37-33-37.778 | 126-58-37.967 | 2189 | 12 | 1 | SECTOR | 3 | 110 | 278 | 446 |
| SL0004X | 37-33-41.738 | 126-58-58.488 | 2189 | 12 | 2 | SECTOR | 3 | 68 | 236 | 404 |
| SL0566X | 37-33-39.207 | 126-58-48.171 | 2189 | 12 | 3 | SECTOR | 2 | 50 | 218 | - |
| SL0300X | 37-33-49.077 | 126-59-05.933 | 2189 | 12 | 4 | SECTOR | 3 | 34 | 202 | 370 |
| SL1213X | 37-33-53.697 | 126-58-47.425 | 2189 | 12 | 5 | OMNI | 1 | 134 | - | - |
| SL0616X | 37-33-44.328 | 126-59-22.321 | 2189 | 12 | 6 | SECTOR | 2 | 84 | 252 | 0 |
| SL0328X | 37-33-13.793 | 126-58-20.400 | 2189 | 12 | 7 | SECTOR | 3 | 64 | 232 | 400 |
| SL0531X | 37-33-12.420 | 126-57-50.918 | 2189 | 12 | 8 | SECTOR | 2 | 38 | 206 | - |
| SL0096X | 37-32-33.098 | 126-58-19.067 | 2189 | 12 | 9 | SECTOR | 3 | 46 | 214 | 382 |
| SL0367X | 37-32-43.196 | 126-57-54.484 | 2189 | 12 | 10 | SECTOR | 3 | 18 | 186 | 354 |
| SL0870X | 37-32-18.953 | 126-58-02.893 | 2189 | 12 | 11 | SECTOR | 1 | 80 | 0 | 0 |

[Fig. 7]

| SOURCE INFORMATION | | | TARGET INFORMATION | STATISTIC INFORMATION | |
|---|---|---|---|---|---|
| BSC | BTS | Sector | Des_PN | Attempt | Fail |
| 1 | 0 | 0 | 18 | 4 | 0 |
| 1 | 0 | 0 | 26 | 449 | 0 |
| 1 | 0 | 0 | 38 | 203 | 0 |
| 1 | 0 | 0 | 46 | 6 | 0 |
| 1 | 0 | 0 | 64 | 270 | 0 |
| 1 | 0 | 0 | 108 | 119 | 0 |
| 1 | 0 | 0 | 218 | 1557 | 0 |
| 1 | 0 | 0 | 232 | 129 | 0 |
| 1 | 0 | 0 | 268 | 83 | 0 |
| 1 | 0 | 0 | 276 | 40 | 0 |
| 1 | 0 | 0 | 278 | 1541 | 1 |
| 1 | 0 | 0 | 312 | 2286 | 10 |
| 1 | 0 | 0 | 354 | 25 | 0 |
| 1 | 0 | 0 | 84 | 160 | 0 |
| 1 | 0 | 0 | 172 | 95 | 0 |
| 1 | 0 | 0 | 236 | 170 | 0 |
| 1 | 0 | 0 | 294 | 23 | 0 |
| 1 | 0 | 0 | 446 | 338 | 0 |
| 1 | 0 | 0 | 400 | 11 | 0 |
| 1 | 0 | 0 | 40 | 38 | 0 |

METHOD AND APPARATUS FOR OPTIMIZING NEIGHBOR LIST AUTOMATICALLY IN SYNCHRONOUS CDMA NETWORK

TECHNICAL FIELD

The present invention relates to method and apparatus for processing handover in a synchronous CDMA (Code Division Multiple Access) network, and particularly to method and apparatus for automatically optimizing a neighbor list.

BACKGROUND ART

Figure 1:
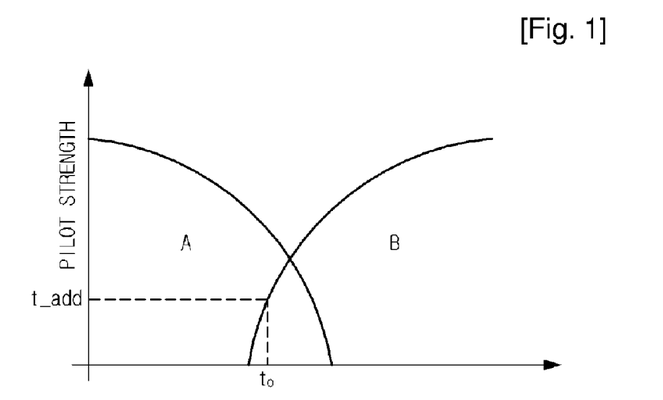
FIG. 1 is a graph showing a PSMM transmission point for processing handover in a synchronous CDMA network.

Generally, a mobile communication system provides a handover function such that a call can be continuously maintained though a mobile terminal departs from a service area (A) of a current base station and then advances into a service area (B) of an adjacent base station as shown in FIG. 1, thereby ensuring mobility.

Figure 2:
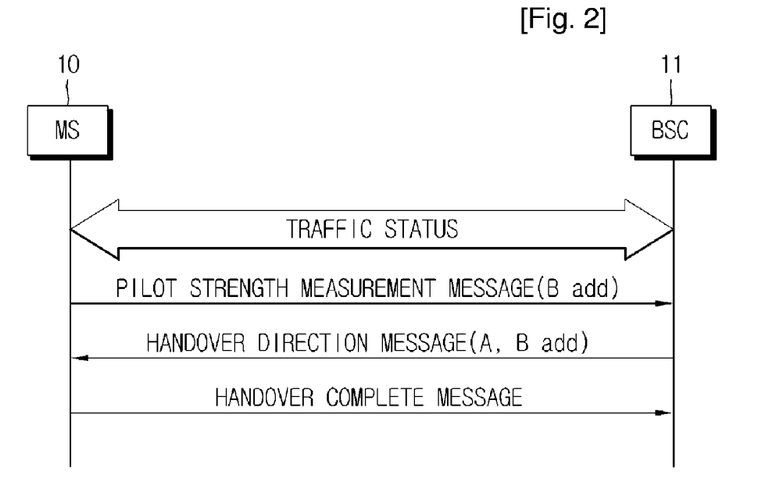
FIG. 2 is a flowchart illustrating a handover processing procedure in case information of a target sector exists in a neighbor list.

Referring to FIG. 2, for conducting the handover function, when a pilot signal strength is detected to exceed a threshold value (t_add), for example, a mobile terminal (MS) 10 transmits PSMM (Pilot Strength Measurement Message) to a base station controller (BSC) 11, and the base station controller 11 analyzes PSMM and then instructs channel allocation to a corresponding base station if B sector (or, target sector) information exists in a neighbor list, and then transmits a handoff direction message to the mobile terminal 10 after the channel allocation is conducted. After that, the mobile terminal 10 adds a new pilot to an active set, and transmits a handoff complete message to the base station controller 11, thereby completing the handover processing.

In a synchronous CDMA network, pilots are managed in groups classified into an active set, a candidate set, a neighbor set and a remaining set. Here, the active set is a group of PN (Pseudo Noise) offsets associated with a traffic channel currently connected to the mobile terminal. The candidate set is a group of pilot offsets not belonging to a current active set but sufficiently capable of signal demodulation. The neighbor set is a group of pilot offsets not belonging to a current active set or a candidate set but having much probability of being belonged to a candidate set for handover. The neighbor set is defined and transmitted by a base station. The remaining set is a group of all pilots not belonging to the active set, the candidate set and the neighbor set.

For the mobile terminal to successfully conduct handover, information of a target sector corresponding to a source sector should exist in a neighbor list. Thus, it is very important to correctly make and update the neighbor list.

Figure 3:
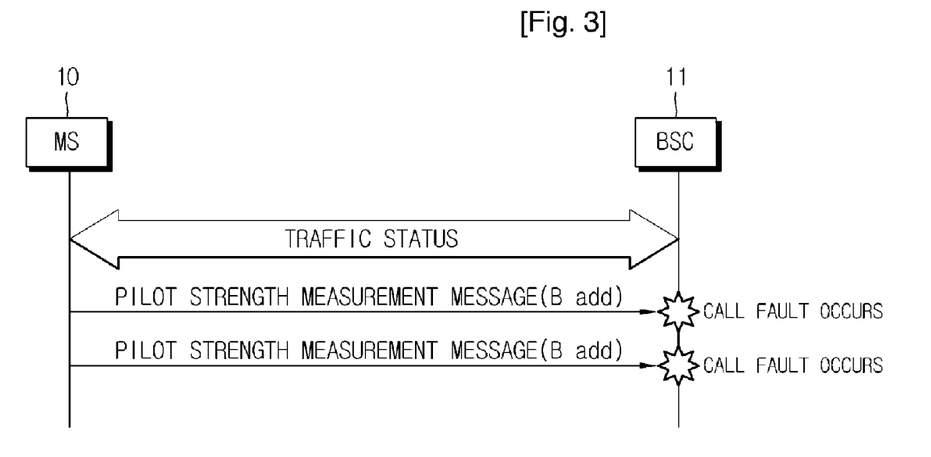
FIG. 3 is a flowchart illustrating a processing procedure in case information of a target sector does not exist in a neighbor list.

FIG. 3 shows a handover failure at points t and t at which handover is conducted when the information of a target sector does not exist in the neighbor list. As shown in FIG. 3, when a pilot signal strength of the B sector is detected to exceed a threshold value (t_add), the mobile terminal 10 transmits PSMM to the base station controller 11, and the base station controller 11 analyzes PSMM and then generates a call fault informing the handover failure if it is checked that a target sector does not exist in the neighbor list. This call fault may cause disconnection of a call, and it occupies about 20 to 30% of all call faults occurring in the system.

The neighbor list is generally made and updated based on manual operation of an operator, which thus takes much data analyzing time, gives possibility of subjective recording or errors, and also takes much time to verify a prepared neighbor list. Thus, there is a need for a scheme capable of automatically optimizing a neighbor list.

As a related technique, Korean Laid-open Patent Publication No. 2004-48038, entitled "Method for automatically updating a neighbor list in a CMDA communication network", discloses increasing a handoff success rate by adding a handoff (handover) failed PN to a neighbor list using a neighbor PN statistical list, or by adjusting a neighbor list extract priority upward according to a handover trial frequency for the handoff-failed PN. However, this technique executes the neighbor list updating process per each base station controller (BSC), so it cannot receive statistical information on a PN not related to the corresponding BSC and thus it cannot update the information.

Meanwhile, Korean Laid-open Patent Publication No. 2005-24643, entitled "Method and apparatus for generating a handover neighbor list in a cellular mobile communication system" discloses determining priorities of subject base stations according to an order of handover occurrence frequencies and then generating a neighbor list according to the order. However, this technique has a limit in analyzing works since it uses handover statistical information per each base station, so it is difficult to give a highly reliable list. In addition, since it is difficult to get accurate location information of a base station not existing in a neighbor list but substantially included in statistics, it hardly calculates an accurate neighbor list, and also it cannot analyze a call fault generated when there is a handover request for a sector in the remaining set.

DISCLOSURE OF INVENTION

Technical Problem

The present invention is designed in consideration of the above problems, and therefore it is an object of the invention to provide method and apparatus for automatically optimizing a neighbor list in a synchronous CDMA network, which is capable of making a neighbor list with high reliability in a way of organically analyzing neighbor list data, call fault data, handover statistical data, base station location data and PN information data and so on of each base station sector in the nationwide network and then determining priorities of target sectors to be input.

Another object of the present invention is to provide method and apparatus for automatically optimizing a neighbor list in a synchronous CDMA network, which is capable of making a neighbor list with high reliability in a way of determining a priority of a target sector by utilizing the number of base stations between a source base station and a target base station, which give an influence on handover.

Still another object of the present invention is to provide method and apparatus for automatically optimizing a neighbor list in a synchronous CDMA network, which is capable of automatically verifying a neighbor list.

Technical Solution

In order to accomplish the above object, the present invention provides a method for automatically optimizing a neighbor list for processing handover in a synchronous CDMA (Code Division Multiple Access) network, which includes the steps of: (a) collecting neighbor list data, call fault data, handover statistical data, base station location data and PN information data of each base station sector in a nationwide network; (b) extracting all target sectors available for handover by analyzing the collected data; (c) endowing a weighting factor to the extracted target sectors according to importance and then sorting calculated results so as to determine priorities; and (d) subsequently inputting the target sector information to the neighbor list according to the priorities.

Preferably, the step (c) includes the steps of: calculating the number of intermediate base stations positioned within a distance between a source base station and a target base station and existing within a threshold angle toward the target base station based on the source base station and a threshold angle toward the source base station based on the target base station, as for the extracted target sectors; and determining priorities of the target sectors by sorting such that a target base station with a relatively lower index, calculated including the number of intermediate base stations and the distance, has a higher priority.

Preferably, the step (b) may further include the step of: verifying contents of the neighbor list by comparing the neighbor list data with the base station location data and the PN information data.

Preferably, the base station location data and the PN information data are compared with system ID (SIS), network ID (NID), base station controller (BSC), base station (BTS) and sector PN (Pseudo Noise) in the neighbor list for the verification.

Preferably, in the step (c), the target sector information is classified into a type that a target sector exists in the neighbor list and exists in the handover statistics, a type that a target sector does not exist in the neighbor list but exists in the handover statistics, a type that a target sector exists in the neighbor list but does not exist in the handover statistics, a type that a target sector does not exist in the neighbor list and a handover failure PN occurs, and a type that a target sector exists in the neighbor list but handover is failed, and then a weighting factor is endowed thereto depending on importance of each type.

Preferably, in the step (c), SID, NID, BSC and BTS information of each classified target sector is utilized to check location of the target sector.

Preferably, a weighting factor is endowed to a handover trial frequency for the target sector of each type.

Preferably, the handover trial frequency information is obtained as a trial frequency of the handover statistics of each sector, or by extracting candidate sets included in the call fault data and then counting the candidate sets.

In another aspect of the present invention, there is also provided an apparatus for automatically optimizing a neighbor list for processing handover in a synchronous CDMA network, which includes: a data collecting unit for collecting neighbor list data, call fault data, handover statistical data, base station location data and PN information data of each base station sector in a nationwide network; a data analyzing unit for analyzing the collected data to extract all target sectors available for handover; a data sorting processing unit for endowing a weighing factor to the extracted target sector information depending on importance and then sorting the calculated results in order so as to determine priorities thereof; and a list input unit for subsequently inputting the target sector information to the neighbor list according to the priorities.

The apparatus for automatically optimizing a neighbor list may further include a base station searching unit for calculating the number of intermediate base stations, which are positioned within a distance between a source base station and a target base station and exist within a threshold angle toward the target base station based on the source base station and within a threshold angle toward the source base station based on the target base station, for the extracted target sectors, wherein the data sorting processing unit determines priorities of the target sectors by sorting such that a target base station with a relatively lower index, calculated including the number of intermediate base stations and the distance, has a higher priority.

The apparatus for automatically optimizing a neighbor list may also further include a list verifying unit for verifying contents of the neighbor list by comparing the neighbor list data with the base station location data and the PN information data.

Preferably, the list verifying unit verifies the contents by comparing SID, NID, BSC, BTS and sector PN data in the neighbor list with the base station location data and the PN information data.

Preferably, the data sorting processing unit classifies the target sector information into a type that a target sector exists in the neighbor list and exists in the handover statistics, a type that a target sector does not exist in the neighbor list but exists in the handover statistics, a type that a target sector exists in the neighbor list but does not exist in the handover statistics, a type that a target sector does not exist in the neighbor list and a handover failure PN occurs, and a type that a target sector exists in the neighbor list but handover is failed, and then endows a weighting factor depending on importance of each type.

Preferably, the data sorting processing unit endows a weighting factor to a handover trial frequency of the target sector of each type.

Preferably, the handover trial frequency information is obtained as a trial frequency of the handover statistics of each sector, or by extracting candidate sets included in the call fault data and then counting the candidate sets.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 4:
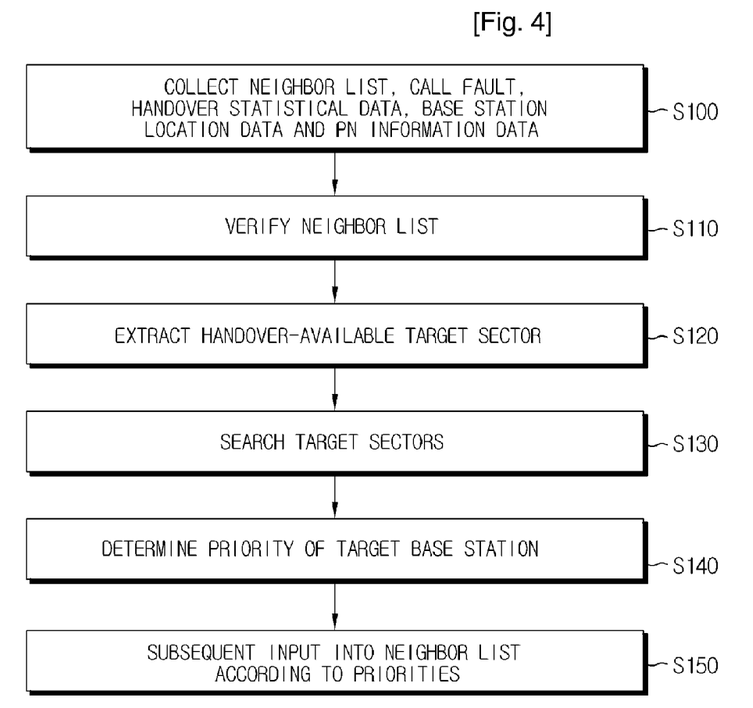
FIG. 4 is a flowchart illustrating how to execute a method for automatically optimizing a neighbor list according to a preferred embodiment of the present invention.

FIG. 4 shows a process of executing a method for automatically optimizing a neighbor list according to a preferred embodiment of the present invention.

Referring to FIG. 4, a process of collecting neighbor list data, call fault data, handover statistical data, base station location data and PN information data corresponding to all sectors composing a synchronous CDMA network is executed (step S100).

Figure 5:
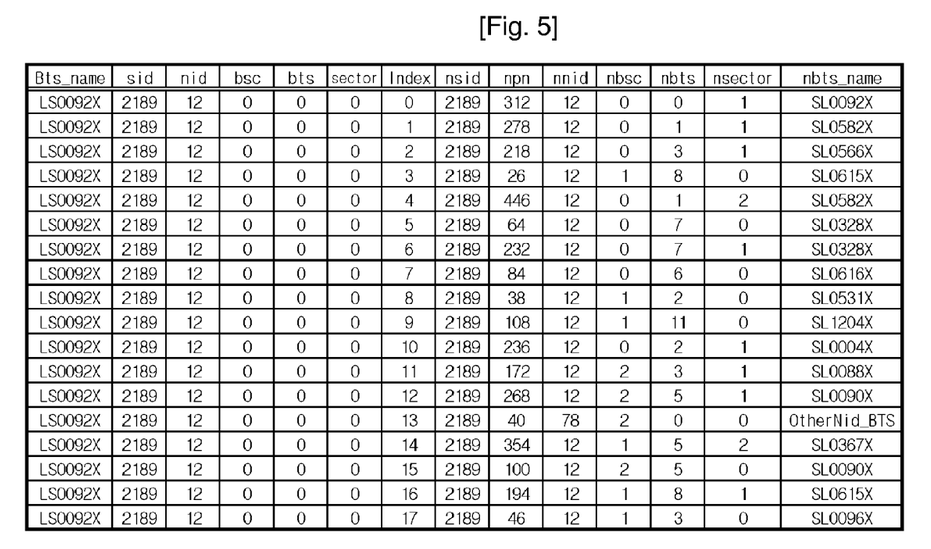
FIG. 5 is a table showing an example of an input neighbor list.

In the neighbor list prepared for each sector according to the standards of a synchronous CDMA network, information such as at most 20 PNs, a corresponding system ID (SID), a network ID (NID), a sector, a base station controller (BSC), FA (Foreign Agent), handover type and so on is input. In FIG. 5, an input example of such a neighbor list is shown.

The call fault is a message generated in the BSC when a mobile terminal requests handover for PN in the remaining set. This message includes corresponding handover failure PN information together with active set information and candidate set information.

Figure 6:
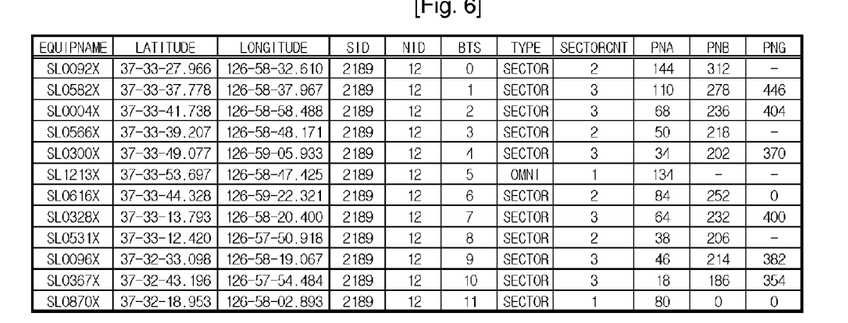
FIG. 6 is a table showing an example of base station location information and PN information data.

The base station location information is expressed using latitude and longitude as shown in FIG. 6. The PN information of a base station corresponds to PN information allocated to each sector that is subdivided into a, b, c and so on. In FIG. 6, the fields PNA, PNB and PNG respectively show PN information of a sector, b sector and c sector.

Figure 7:
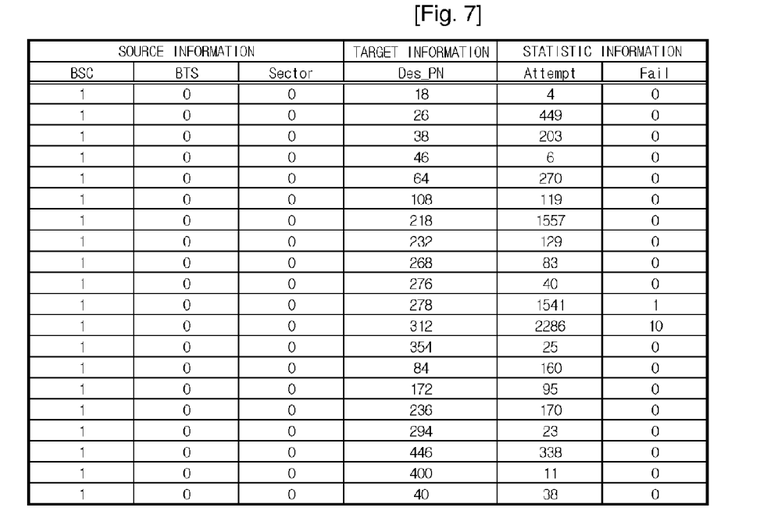
FIG. 7 is a table showing an example of handover statistical data.

The handover statistics provides information of a source sector and a target sector, and information such as handover trial frequency and handover failure frequency, as shown in FIG. 7. The table of FIG. 7 shows an example of handover trial frequency and handover failure frequency to a target sector from a source sector corresponding to the first BSC, $0^{th}$ base station (BTS), a sector (Sector ID=0).

After collecting data as mentioned above, a process of detecting an error by means of verification of contents by comparing an already prepared neighbor list for the source sector of the mobile terminal requesting handover with the base station location and PN information data is preferably executed (step S110). In the verification, information such as SID, NID, BSC, BTS, sector PN and so on of a target sector is compared.

After the verification of the neighbor list is completely verified, a process of analyzing the neighbor list, the call fault, the handover statistical data, the base station location information and the PN information data, which are collected in S100, and then extracting all target sectors available for handover is executed (step S120). That is to say, the neighbor list data is analyzed to extract handover-available target sectors decided by an operator, the call fault data is analyzed to extract target sectors occurring any actual problem, and the handover statistical data is analyzed to extract handover-available target sectors in the statistics.

Then, the extracted target sectors are searched to determine a priority of a target base station to be input to the neighbor list (steps S130 and S140).

For searching each target sector, preferably, the number of intermediate base stations giving an influence while moving from a source base station to a corresponding target base station is calculated. That is to say, the number of intermediate base stations located within an absolute distance between the source base station and the target base station, calculated by the collected base station latitude and longitude information, and positioned within a forward threshold angle toward the target base station based on the source base station and a backward threshold angle toward the source base station based on the target base station is calculated.

The forward threshold angle is defined as an angle that is an absolute value obtained by deducting an angle between the source base station and the intermediate base station from an angle between the source base station and the target base station. In addition, the backward threshold angle is defined as an angle that is an absolute value obtained by deducting an angle between the target base station and the intermediate base station from an angle between the target base station and the source base station. Here, as well known in the art, the angle between base stations may be easily calculated using a trigonometrical function of a right-angled triangle that takes three sides with a distance in a straight line between the corresponding base stations, a horizontal distance corresponding to a difference of latitudes of the base stations, and a vertical distance corresponding to a difference of longitudes of the base stations.

After the number of intermediate base stations within the forward and backward threshold angles of the source base station and the target base station is calculated, an index of each target sector is calculated using the number of intermediate base stations and a distance between the source base station and the target base station. Then, priorities of the target sectors are determined by sorting the target sectors in order so that a target base station with a lower index has a higher priority. This index may be calculated using an operation that multiplies the number of intermediate base stations by a value obtained by endowing a predetermined weighting factor to the absolute distance between the source base station and the target base station, but not limitedly. Here, the weighting factor is an experience value arbitrarily determined by an operator for facilitating easier sorting.

In the index calculating process, it is preferred to classify the target sectors extracted in S120 depending on their types and then further include a resultant value obtained by endowing a predetermined weighting value depending on its importance. In this case, an index is calculated for each target sector in a way of endowing pre-determined weighting factors to the number of intermediate base stations, the distance between the source base station and the target base station, and the importance according to the type of the corresponding target sector and then executing a pre-determined operation thereto.

Here, the types of target sectors are preferably classified into a type that a target sector exists in the already prepared neighbor list and also in the handover statistics, a type that a target sector does not exist in the neighbor list but exists in the handover statistics, a type that a target sector exists in the neighbor list but does not exist in the handover statistics, a type that a target sector does not exist in the neighbor list and an handover failure PN occurs, and a type that a target sector exists in the neighbor list but handover is failed.

Location information for target sectors classified depending on their types are verified by utilizing SID, NID, BSC and BTS information corresponding to each target sector.

After target sectors are classified, a weighting factor is endowed thereto depending on importance of each type, and then the calculated results are sorted in order so as to determine priorities. At this time, the weighting factor is an experience value arbitrarily decided by an operator for facilitating easier sorting, and it is preferably endowed for a handover trial frequency of each target sector. The handover trial frequency information may be obtained as a trial frequency of the handover statistics of each sector, or by extracting candidate sets included in the call fault data and then counting them.

If the information of target sectors is subsequently input to the neighbor list according to the priorities determined in the above method, a process for automatically optimizing the neighbor list is completed (step S150). The neighbor list optimized as mentioned above is automatically or manually input to an O&M (Operation and Maintenance) server that is a wireless management system, and then applied to a CDMA nationwide network.

Figure 8:
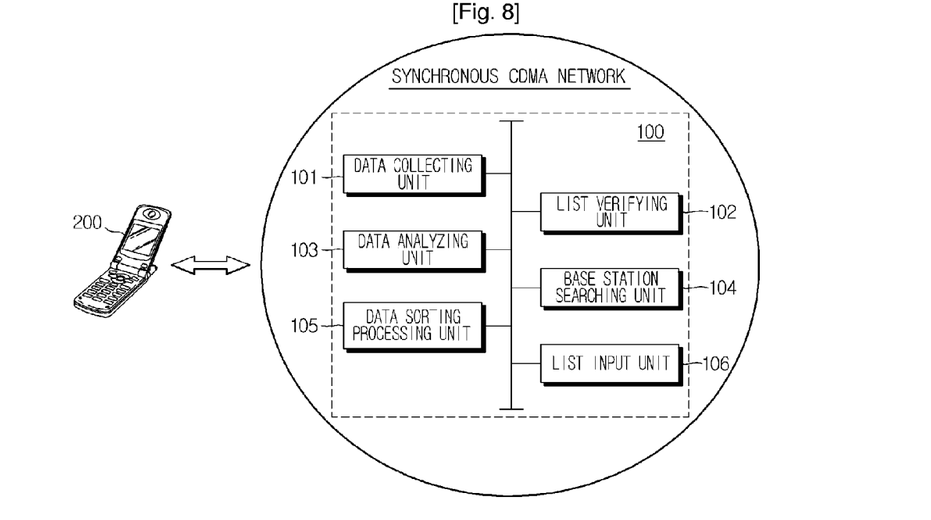
FIG. 8 is a block diagram showing an apparatus for automatically optimizing a neighbor list according to a preferred embodiment of the present invention.

FIG. 8 shows an apparatus for automatically optimizing a neighbor list according to a preferred embodiment of the present invention.

Referring to FIG. 8, the automatic neighbor list optimizing apparatus 100 of this embodiment includes a data collecting unit 101 for collecting handover-related data, a data analyzing unit 103 for analyzing the data and extracting handover-available target sectors, a data sorting processing unit 105 for determining priorities of target sectors, and a list input unit 106 for inputting target sector information to the neighbor list according to the determined priorities.

The data collecting unit 101 collects neighbor list data corresponding to all sectors composing a synchronous CDMA network, call fault data including handover-failed PN information, base station location information data expressed using latitude and longitude, PN information data of each sector subdivided in a base station, and handover statistical data giving information related to a source sector and a target sector and also information such as handover trial frequency and failure frequency.

The data analyzing unit 103 extracts all target sectors available for handover by analyzing the neighbor list data, the call fault data, the handover statistical data, the base station location information data and the PN information data. That is to say, the data analyzing unit 103 extracts handover-available target sectors decided by an operator by analyzing the neighbor list data, extracts target sectors having caused any actual problem by analyzing the call fault data, and extracts handover-available target sectors in statistics by analyzing the handover statistical data.

The automatic neighbor list optimizing apparatus 100 preferably further includes a list verifying unit 102 for verifying contents of the neighbor list so as to detect an error of the neighbor list. The list verifying unit 102 verifies contents and detects an error by comparing the base station location and PN information data with the neighbor list already prepared for a source sector of a mobile terminal 200 that requests handover.

Here, the information to be compared in the verifying process includes SID, NID, BSC, BTS, sector PN and so on of a target sector.

Figure 9:
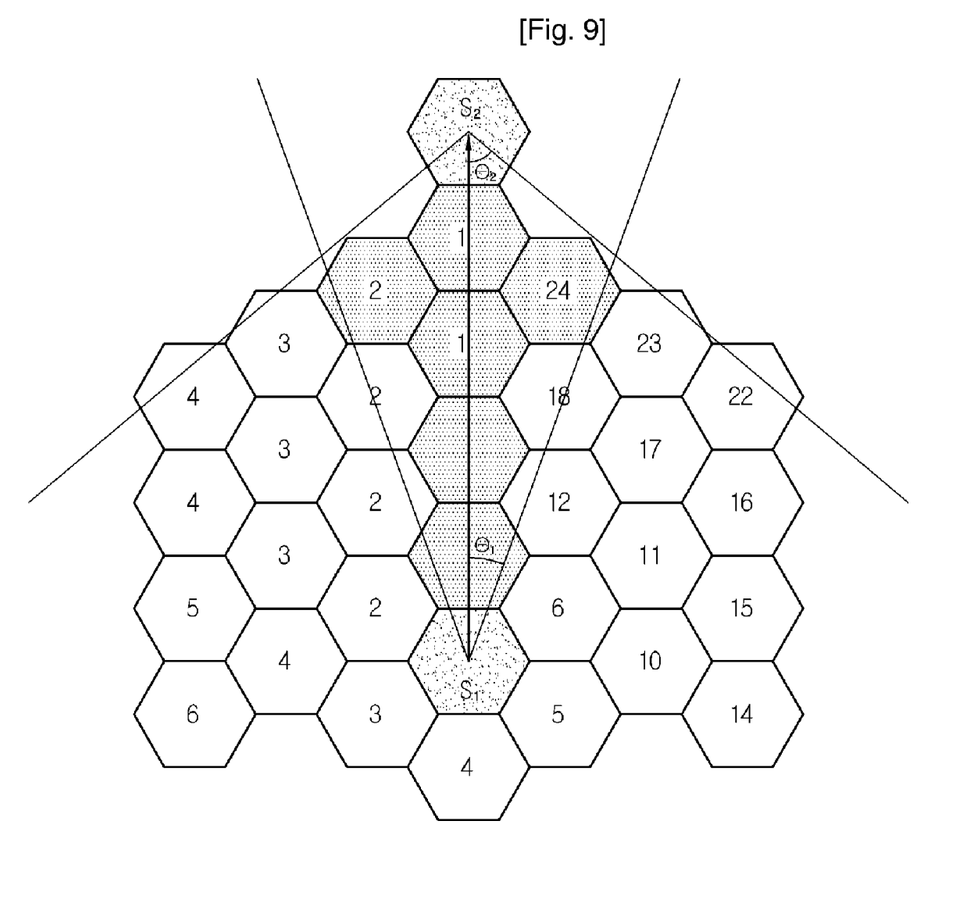
FIG. 9 shows an example of calculating the number of intermediate base stations using a base station searching unit.

The automatic neighbor list optimizing apparatus 100 is preferably further provided with a base station searching unit 104 so as to search target sectors extracted by the data analyzing unit 103 and then calculate the number of intermediate base stations corresponding to each target base station. Here, the method for calculating the number of intermediate base stations existing between a source base station and a target base station is identical to the above case. That is to say, the number of intermediate base stations positioned within an absolute distance between a source base station and a target base station and also existing within a forward threshold angle toward the target base station based on the source station and a backward threshold angle toward the source base station based on the target station is calculated. For example, as shown in FIG. 9, in case a forward threshold angle $q_1$ is 20 in a view point of the source base station $S_1$ and a backward threshold angle $q_2$ is 40 in a view point of the target base station $S_2$, the number of base stations giving an influence between the source base station $S_1$ and the target station $S_2$ is calculated as 6.

The data sorting processing unit 105 determines priorities of target sectors by sorting target base stations so that a target base station with a lower index, calculated using the number of intermediate base stations corresponding to each target base station and the distance between the source base station and the target base station, has a higher priority. For this purpose, the data sorting processing unit 105 conducts an operation for each target base station, namely multiplying the number of intermediate base stations by a value obtained by endowing a predetermined weighting factor to the absolute distance between the source base station and the target base station, and then sorts the target base stations so that a relatively lower value among the operation resultant values has a higher priority.

More preferably, the data sorting processing unit 105 classifies the target sectors extracted in the data analyzing unit 103 depending on their types, and then calculates the index by additionally including a resultant value obtained by endowing a pre-determined weighting factor according to their importance. In this case, the index is calculated for each target sector in a way of endowing a predetermined weighting factor to the number of intermediate base stations, the distance between the source base station and the target base station, and the importance according to a type of the corresponding target sector, and then executing a predetermined operation thereto. The types of target sectors are preferably classified into a type that a target sector exists in the already prepared neighbor list and also in the handover statistics, a type that a target sector does not exist in the neighbor list but exists in the handover statistics, a type that a target sector exists in the neighbor list but does not exist in the handover statistics, a type that a target sector does not exist in the neighbor list and an handover failure PN occurs, and a type that a target sector exists in the neighbor list but handover is failed.

As an alternative, the data sorting processing unit 105 may also calculate the index using only a value obtained by endowing a predetermined weighting factor to the importance according to the type of the corresponding target sector.

The list input unit 106 optimizes the neighbor list by subsequently inputting the target sector information according to the priorities determined by the data sorting processing unit 105. The neighbor list optimized as mentioned above is input to an O&M (Operation and Maintenance) server that is a wireless management system, and then applied to a CDMA nationwide network.

The automatic neighbor list optimizing apparatus configured as mentioned above according to a preferred embodiment of the present invention initially operates the data collecting unit 101 to collect the neighbor list data, the call fault data, the handover statistical data, and the base station location data and the PN information data, and then operates the list verifying unit 102 to verify contents of the neighbor list and thus detect an error.

After the neighbor list is completely verified, the data analyzing unit 103 analyzes the collected data to extract all target sectors available for handover.

In addition, the base station searching unit 104 calculates the number of intermediate base stations positioned within a threshold angle within a distance range between the source base station and the target base station, and the data sorting processing unit 105 sorts the target base stations from one having a relatively lower index calculated for each target sector in a way of endowing a predetermined weighting factor to the number of intermediate base stations, the distance between the source base station and the target base station, and the importance according to a type of the corresponding target sector, and then conducting a predetermined operation thereto, thereby determining priorities of the target sectors.

When the priorities of the target sectors are determined, the list input unit 106 automatically inputs the target sector information to the neighbor list according to the priorities, thereby optimizing the list.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, after neighbor list data, call fault data, base station location data and PN information data, handover statistical data of each sector and so on of each base station sector of the nationwide network are analyzed, the neighbor list is automatically input utilizing all handover-available target sector information, so it is possible to optimize the neighbor list within a short time though a service area is changed due to establishment of a new base station/relay or moving of an existing base station/relay.

In particular, since an input priority of the neighbor list is obtained by calculating the number of intermediate base stations giving an influence while moving from a source base station to a target base station, it is possible to improve reliability of the neighbor list.

The invention claimed is:

1. A method for automatically optimizing a neighbor list for processing handover in a synchronous CDMA (Code Division Multiple Access) network, comprising:
   (a) collecting, by a data collecting unit, neighbor list data, call fault data, handover statistical data, base station location data and PN (Pseudo Noise) information data of each base station sector in a nationwide network;
   (b) extracting, by a data analyzing unit, all target sectors available for handover by analyzing the collected data;
   (c) calculating, by a base station searching unit, the number of intermediate base stations positioned within a distance between a source base station and a target base station and existing within a threshold angle toward the target base station based on the source base station and a threshold angle toward the source base station based on the target base station, as for the extracted target sectors; and
   (d) determining, by a data sorting processing unit, priorities of the target sectors by sorting such that a target base station with a relatively lower index, calculated including the number of intermediate base stations and the distance, has a higher priority;
   (e) wherein the index is calculated using an operation that multiplies the number of intermediate base stations by a value obtained by endowing a predetermined weighting factor to the absolute distance between the source base station and the target base station.
   (f) subsequently inputting, by a list input unit, the target sector information to the neighbor list according to the priorities.

2. The method for automatically optimizing a neighbor list according to claim 1, in the step (b), further comprising:
   verifying contents of the neighbor list by comparing the neighbor list data with the base station location data and the PN information data.

3. The method for automatically optimizing a neighbor list according to claim 2, wherein the base station location data and the PN information data are compared with system ID (SID), network ID (NID), base station controller (BSC), base station (BTS) and sector PN (Pseudo Noise) in the neighbor list for the verification.

4. The method for automatically optimizing a neighbor list according to claim 1,
   wherein, the target sector information is classified into a type that a target sector exists in the neighbor list and exists in the handover statistics, a type that a target sector does not exist in the neighbor list but exists in the handover statistics, a type that a target sector exists in the neighbor list but does not exist in the handover statistics, a type that a target sector does not exist in the neighbor list and a handover is failed, or a type that a target sector exists in the neighbor list but a handover is failed, and then the weighting factor is endowed thereto depending on importance of each type.

5. The method for automatically optimizing a neighbor list according to claim 4, wherein, system ID (SID), network ID (NID), base station controller (BSC) and base station (BTS) information of each classified target sector is utilized to check location of the target sector.

6. The method for automatically optimizing a neighbor list according to claim 4, wherein the weighting factor is endowed to a handover trial frequency for the target sector of each type.

7. The method for automatically optimizing a neighbor list according to claim 6, wherein the handover trial frequency information is obtained as a trial frequency of the handover statistics of each sector, or as a number of candidate sets extracted from the call fault data.

8. An apparatus for automatically optimizing a neighbor list for processing handover in a synchronous CDMA network, comprising:
   a data collecting unit for collecting neighbor list data, call fault data, handover statistical data, base station location data and PN (Pseudo Noise) information data of each base station sector in a nationwide network;
   a data analyzing unit for analyzing the collected data to extract all target sectors available for handover;
   a base station searching unit for calculating the number of intermediate base stations, which are positioned within a distance between a source base station and a target base station and exist within a threshold angle toward the target base station based on the source base station and within a threshold angle toward the source base station based on the target base station, for the extracted target sectors;
   a data sorting processing unit for endowing a weighting factor to the extracted target sector information depending on importance and then sorting the calculated results in order so as to determine priorities thereof;
   wherein the data sorting processing unit determines priorities of the target sectors by sorting such that a target base station with a relatively lower index, calculated including the number of intermediate base stations and the distance, has a higher priority;

wherein the index is calculated using an operation that multiplies the number of intermediate base stations by a value obtained by endowing the weighting factor to the absolute distance between the source base station and the target base station; and a list input unit for subsequently inputting the target sector information to the neighbor list according to the priorities.

9. The apparatus for automatically optimizing a neighbor list according to claim 8, further comprising:

a list verifying unit for verifying contents of the neighbor list by comparing the neighbor list data with the base station location data and the PN information data.

10. The apparatus for automatically optimizing a neighbor list according to claim 9, wherein the list verifying unit verifies the contents by comparing system ID (SID), network ID (NID), base station controller (BSC) and base station (BTS) and sector PN data in the neighbor list with the base station location data and the PN information data.

11. The apparatus for automatically optimizing a neighbor list according to claim 8, wherein the data sorting processing unit classifies the target sector information into a type that a target sector exists in the neighbor list and exists in the handover statistics, a type that a target sector does not exist in the neighbor list but exists in the handover statistics, a type that a target sector exists in the neighbor list but does not exist in the handover statistics, a type that a target sector does not exist in the neighbor list and a handover is failed or a type that a target sector exists in the neighbor list but a handover is failed, and then endows the weighting factor depending on importance of each type.

12. The apparatus for automatically optimizing a neighbor list according to claim 11, wherein the data sorting processing unit endows the weighting factor to a handover trial frequency of the target sector of each type.

13. The apparatus for automatically optimizing a neighbor list according to claim 12, wherein the handover trial frequency information is obtained as a trial frequency of the handover statistics of each sector, or as a number of candidate sets extracted from the call data.

* * * * *